C. L. DE MARTIN.
SPOT LIGHT ATTACHMENT FOR WIND SHIELDS.
APPLICATION FILED MAY 10, 1917.
1,250,812.  Patented Dec. 18, 1917.
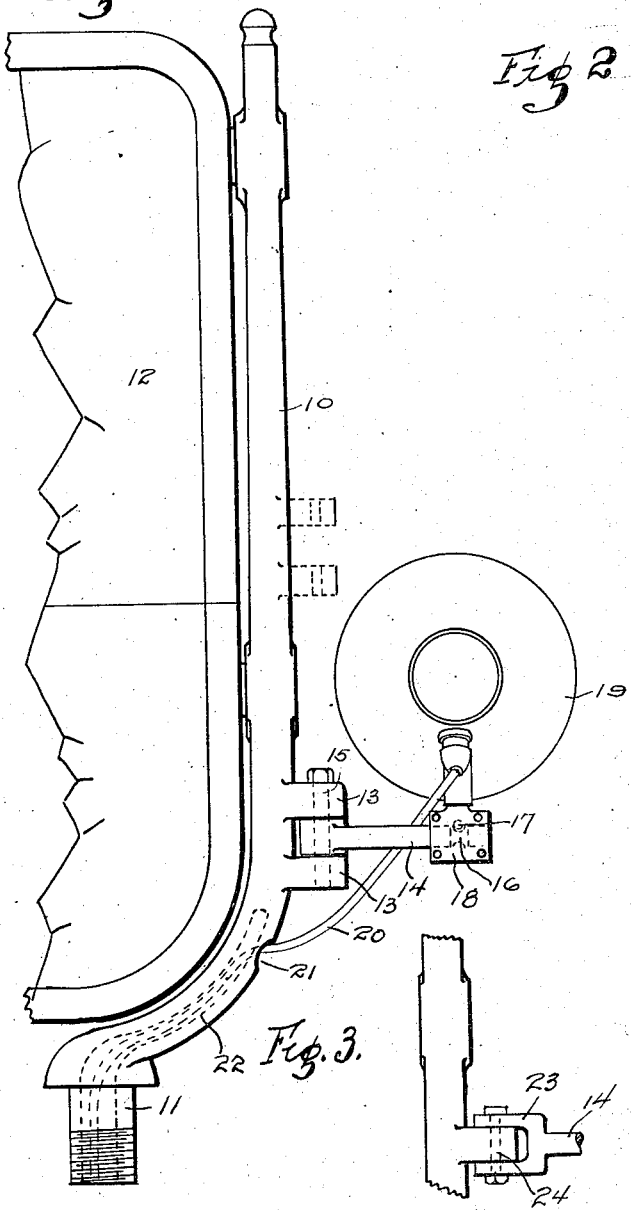
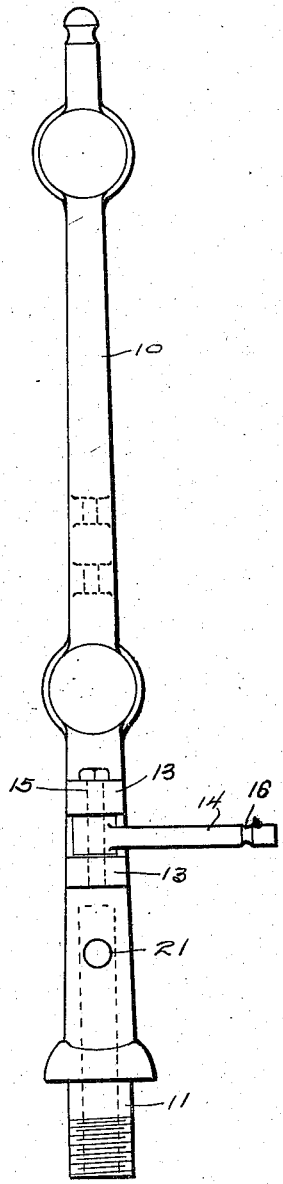
Inventor
CHARLES L. DE MARTIN.

UNITED STATES PATENT OFFICE.

CHARLES LEWIS DE MARTIN, OF CONNERSVILLE, INDIANA, ASSIGNOR TO INDIANA LAMP COMPANY, OF CONNERSVILLE, INDIANA, A CORPORATION.

SPOT-LIGHT ATTACHMENT FOR WIND-SHIELDS.

1,250,812.      Specification of Letters Patent.      Patented Dec. 18, 1917.

Application filed May 10, 1917. Serial No. 167,800.

*To all whom it may concern:*

Be it known that I, CHARLES L. DE MARTIN, a citizen of the United States, and a resident of Connersville, county of Fayette, and State of Indiana, have invented a certain new and useful Spot-Light Attachment for Wind-Shields; and I do hereby declare that the following is a full, clear, and exact description thereof, reference being had to the accompanying drawings, in which like letters refer to like parts.

This invention relates to a wind shield support and lamp bracket for automobiles.

Heretofore in attaching spot lights and the like to the wind shield of an automobile it has been necessary to clamp the spot light bracket thereon in an unsightly and awkward manner, and the object of this invention is to eliminate the necessity of attaching a bracket to the wind shield support whereby the spot light may be made a permanent fixture and the awkward and ungainly bracket done away with. This is accomplished by forming outwardly extending ears integral with the wind shield support on which the spot light is pivotally supported.

Another feature of the invention is the swivel for permitting the spot light to be swiveled on the bracket and at the same time be secured in a relatively fixed position thereon.

The full nature of the invention will be understood from the accompanying drawings and the following description and claims:

Figure 1 is an elevation of a wind shield support showing a spot light attached thereto and a portion of the wind shield broken away. Fig. 2 is a side elevation of the wind shield support. Fig. 3 is a portion of the lamp bracket showing a modified form thereof.

In the drawings there is shown a wind shield support 10 adapted to be secured on an automobile by the studs 11 which support the wind shield 12. Extending outwardly from said support and integral therewith there are a pair of ears 13 between which an arm 14 is pivotally secured by a pin 15.

The end of the arm 14 is provided with an annular depression 16 adapted to be engaged by a tangentially disposed pin 17 extending through the brackets 18 which support the spot light 19. By means of this construction the arm 14 may be swung laterally on the pivot pin 15 and is supported by the ears 13 and the lamp 19 may be vertically swiveled about the arm 14 and held thereon by means of the pin 17 extending tangentially of said annular groove. Provision is made in the wind shield support for a cable 20 to extend through an opening 21 therein and channel 22 to the body of the car, thereby doing away with the dangling electric wiring on the spot lights commonly used.

In the modified form shown in Fig. 3 there is provided only one ear 13 which is straddled by a jaw 23 on the pivotal end of the arm 14, which is pivoted to said ear by the pin 24.

It may, therefore, be seen from the above that a lamp support may be made in a neat and compact form more cheaply than the attachments now in use, which gives a better appearance and affords greater stability for the lamp.

The invention claimed is:

1. A wind shield support having an outwardly extending ear integral therewith, said support having a longitudinally extending channel in the lower portion thereof for the passage of wires, an arm supported by said ear on which a lamp may be mounted, and a pin for pivotally securing said arm on said ear.

2. In combination with an automobile spot lamp including an arm on which said lamp is swiveled, said arm having a peripheral recess and a pin tangentially engaging said recess, of a wind shield support, a pair of outwardly extending ears mounted integral on said support, and a pin adapted to pivotally secure said arm to said ears for permitting the lateral swing thereof.

3. In combination with an automobile spot lamp including an arm on which said lamp may be swiveled, and a cable extending therefrom, of a wind shield support having a pair of outwardly extending ears integral therewith, a pin for pivotally mounting said arm on said ears whereby it may swing laterally thereon, said support having a longitudinally extending channel through which said cable extends.

4. In combination with a wind shield support having an outwardly extending ear thereon, of an arm pivotally mounted on said ear, said arm being provided with an annular recess near the outer end thereof, a lamp support mounted on said arm so as to swivel thereon, and a pin adapted to extend through said bracket in tangential engagement with said recess for permitting said bracket to swing thereon and preventing any movement thereof longitudinal of said arm.

In witness whereof, I have hereunto affixed my signature.

CHAS. LEWIS DE MARTIN.

Copies of this patent may be obtained for five cents each, by addressing the "Commissioner of Patents, Washington, D. C."